US011483905B2

(12) United States Patent
Dore et al.

(10) Patent No.: US 11,483,905 B2
(45) Date of Patent: Oct. 25, 2022

(54) METHOD AND APPARATUS FOR DETERMINING HEATING STRATEGIES

(71) Applicants: WHIRLPOOL CORPORATION, Benton Harbor, MI (US); Panasonic Corporation, Kadoma (JP)

(72) Inventors: Giovanni Dore, Arezzo (IT); Francesco Giordano, Cremona (IT); Davide Guatta, Cassinetta (IT)

(73) Assignees: Whirlpool Corporation, Benton Harbor, MI (US); Panasonic Holdings Corporation (JP)

( * ) Notice: Subject to any disclaimer, the term of this patent is extended or adjusted under 35 U.S.C. 154(b) by 399 days.

(21) Appl. No.: 16/068,478

(22) PCT Filed: Jan. 8, 2016

(86) PCT No.: PCT/US2016/012746
§ 371 (c)(1),
(2) Date: Jul. 6, 2018

(87) PCT Pub. No.: WO2017/119909
PCT Pub. Date: Jul. 13, 2017

(65) Prior Publication Data
US 2019/0008005 A1 Jan. 3, 2019

(51) Int. Cl.
*H05B 6/64* (2006.01)
*H05B 6/66* (2006.01)
*H05B 6/68* (2006.01)

(52) U.S. Cl.
CPC ......... *H05B 6/6435* (2013.01); *H05B 6/6447* (2013.01); *H05B 6/668* (2013.01); *H05B 6/686* (2013.01); *H05B 6/688* (2013.01)

(58) Field of Classification Search
CPC ...... H05B 6/6447; H05B 6/705; H05B 6/687; H05B 6/68; H05B 6/686; H05B 6/72; H05B 6/645; H05B 2206/044; H05B 6/64; H05B 6/6438; H05B 6/6467; H05B 6/682; H05B 6/05
(Continued)

(56) References Cited

U.S. PATENT DOCUMENTS 2,742,612 A 4/1956 Cohn
2,956,143 A 10/1960 Schall
(Continued)

FOREIGN PATENT DOCUMENTS

CN 1523293 A 8/2004
CN 101118425 2/2008
(Continued)

*Primary Examiner* — Justin C Dodson
(74) *Attorney, Agent, or Firm* — Price Heneveld LLP (57) ABSTRACT

A method of determining heating strategies for a cooking appliance (10) includes obtaining geometry dimensions, power values, and frequency values of the cooking appliance (10), selecting a food item (14) and obtaining a food geometry, permittivity value, and initial temperature of the selected food item (14). A heating pattern (28) for heating the selected food item (14) is estimated based on the food geometry, permittivity value, and initial temperature of the selected food item (14) and data indicative of the estimated heating pattern (28) is inputted to an operating control system (21) to achieve the estimated heating strategy.

6 Claims, 4 Drawing Sheets

(58) Field of Classification Search
USPC ....... 219/703, 710, 709, 715, 702, 716, 494,
219/712, 518, 678, 690, 756; 426/241,
426/234, 113, 237; 700/211
See application file for complete search history.

(56) References Cited

U.S. PATENT DOCUMENTS

| | | | |
|---|---|---|---|
| 2,958,754 A | 11/1960 | Hahn | |
| 2,981,904 A | 4/1961 | Ajioka et al. | |
| 3,260,832 A | 7/1966 | Johnson | |
| 3,265,995 A | 8/1966 | Hamasaki | |
| 3,430,023 A | 2/1969 | Tingley | |
| 3,440,385 A | 4/1969 | Smith | |
| 3,489,135 A | 1/1970 | Astrella | |
| 3,536,129 A | 10/1970 | White | |
| 3,639,717 A | 2/1972 | Mochizuki | |
| 3,731,035 A | 5/1973 | Jarvis et al. | |
| 3,737,812 A | 6/1973 | Gaudio et al. | |
| 3,812,316 A | 5/1974 | Milburn | |
| 4,000,390 A | 12/1976 | Graff | |
| 4,088,861 A | 5/1978 | Zwillinger | |
| D248,607 S | 7/1978 | Yamamura et al. | |
| 4,101,750 A | 7/1978 | Doner | |
| 4,107,502 A | 8/1978 | Tanaka et al. | |
| 4,136,271 A | 1/1979 | Tanaka et al. | |
| 4,139,828 A | 2/1979 | Commault et al. | |
| 4,143,646 A | 3/1979 | Sampsel et al. | |
| 4,166,207 A | 8/1979 | Burke | |
| 4,196,332 A | 1/1980 | MacKay et al. | |
| 4,264,800 A | 4/1981 | Jahnke et al. | |
| 4,283,614 A | 8/1981 | Tanaka et al. | |
| 4,321,445 A | 3/1982 | Kristof et al. | |
| 4,354,562 A | 10/1982 | Newman | |
| 4,374,319 A | 2/1983 | Guibert | |
| D268,079 S | 3/1983 | Miyake et al. | |
| 4,463,324 A | 7/1984 | Rolfs | |
| D275,546 S | 9/1984 | Tanaka et al. | |
| D276,122 S | 10/1984 | Tanaka et al. | |
| D277,355 S | 1/1985 | Miyake et al. | |
| 4,595,827 A | 6/1986 | Hirai et al. | |
| D285,893 S | 9/1986 | Mizuma et al. | |
| 4,628,351 A | 12/1986 | Heo | |
| 4,673,800 A | 6/1987 | Hirai et al. | |
| 4,703,151 A | 10/1987 | Sakamoto | |
| 4,743,728 A | 5/1988 | Nagafusa et al. | |
| D297,698 S | 9/1988 | Nishikawa et al. | |
| D297,800 S | 9/1988 | Feil et al. | |
| 4,786,774 A | 11/1988 | Kaminaka | |
| D303,063 S | 8/1989 | Satake | |
| 4,870,238 A | 9/1989 | Hodgetts et al. | |
| 4,886,046 A | 12/1989 | Welch et al. | |
| 4,937,413 A | 6/1990 | Spruytenburg et al. | |
| 4,999,459 A | 3/1991 | Smith et al. | |
| 5,075,525 A | 12/1991 | Jung | |
| D330,144 S | 10/1992 | Takebata et al. | |
| 5,369,254 A | 11/1994 | Kwon | |
| D353,511 S | 12/1994 | Saimen | |
| 5,483,045 A | 1/1996 | Gerling | |
| 5,546,927 A | 8/1996 | Lancelot | |
| 5,558,800 A | 9/1996 | Page | |
| D378,723 S | 4/1997 | Weiss | |
| 5,619,983 A | 4/1997 | Smith | |
| D385,155 S | 10/1997 | Weiss et al. | |
| 5,735,261 A | 4/1998 | Kieslinger | |
| 5,831,253 A | 11/1998 | Han et al. | |
| 5,878,910 A | 3/1999 | Gibernau et al. | |
| D411,074 S | 6/1999 | Sakai et al. | |
| 5,919,389 A | 7/1999 | Uehashi et al. | |
| 5,928,540 A | 7/1999 | Antoine et al. | |
| 5,973,305 A | 10/1999 | Kim et al. | |
| 5,981,929 A | 11/1999 | Maeda et al. | |
| 6,018,158 A | 1/2000 | Kang | |
| 6,054,696 A | 4/2000 | Lewis et al. | |
| 6,057,535 A | 5/2000 | Derobert et al. | |
| 6,097,019 A | 8/2000 | Lewis et al. | |
| 6,268,593 B1 | 7/2001 | Sakai | |
| 6,359,270 B1 | 3/2002 | Bridson | |
| 6,429,370 B1 | 8/2002 | Norte et al. | |
| 6,557,756 B1 | 5/2003 | Smith | |
| 6,559,882 B1 | 5/2003 | Kerchner | |
| D481,582 S | 11/2003 | Seum et al. | |
| 6,664,523 B1 | 12/2003 | Kim et al. | |
| 6,696,678 B2 | 2/2004 | Hudson et al. | |
| D495,556 S | 9/2004 | Milrud et al. | |
| 6,853,399 B1 | 2/2005 | Gilman et al. | |
| D521,799 S | 5/2006 | Ledingham et al. | |
| D522,801 S | 6/2006 | Lee | |
| D527,572 S | 9/2006 | Lee et al. | |
| 7,105,787 B2 | 9/2006 | Clemen, Jr. | |
| 7,111,247 B2 | 9/2006 | Choi et al. | |
| D530,973 S | 10/2006 | Lee et al. | |
| D531,447 S | 11/2006 | Lee et al. | |
| D532,645 S | 11/2006 | Lee | |
| 7,193,195 B2 | 3/2007 | Lundstrom et al. | |
| D540,105 S | 4/2007 | Lee et al. | |
| D540,613 S | 4/2007 | Jeon | |
| D550,024 S | 9/2007 | Jeon | |
| 7,361,871 B2 | 4/2008 | Cho et al. | |
| D568,675 S | 5/2008 | Kawata | |
| 7,476,828 B2 | 1/2009 | Genua | |
| 7,482,562 B2 | 1/2009 | Song et al. | |
| D586,619 S | 2/2009 | Pino et al. | |
| D587,959 S | 3/2009 | Hensel | |
| 7,556,033 B2 | 7/2009 | Kim | |
| D602,306 S | 10/2009 | Lavy | |
| 7,770,985 B2 | 8/2010 | Davis et al. | |
| D625,557 S | 10/2010 | Pino et al. | |
| D626,370 S | 11/2010 | Baek | |
| 7,919,735 B2 | 4/2011 | Kiyono et al. | |
| 7,926,313 B2 | 4/2011 | Schenkl et al. | |
| D638,249 S | 5/2011 | Ryan et al. | |
| 8,074,637 B2 | 12/2011 | Yamauchi | |
| D655,970 S | 3/2012 | De'Longhi | |
| D658,439 S | 5/2012 | Curtis et al. | |
| D662,759 S | 7/2012 | Blacken et al. | |
| D663,156 S | 7/2012 | Curtis et al. | |
| D670,529 S | 11/2012 | Hensel | |
| D673,000 S | 12/2012 | De'Longhi | |
| D673,418 S | 1/2013 | Lee et al. | |
| D678,711 S | 3/2013 | Reiner | |
| 8,389,916 B2 | 3/2013 | Ben-Shmuel et al. | |
| 8,455,803 B2 | 6/2013 | Danzer et al. | |
| 8,492,686 B2 | 7/2013 | Bilchinsky et al. | |
| 8,530,807 B2 | 9/2013 | Niklasson et al. | |
| 8,610,038 B2 | 12/2013 | Hyde et al. | |
| 8,745,203 B2 | 6/2014 | McCoy | |
| 8,803,051 B2 | 8/2014 | Lee et al. | |
| D717,579 S | 11/2014 | Gregory et al. | |
| 9,040,879 B2 | 5/2015 | Libman et al. | |
| D736,554 S | 8/2015 | Steiner et al. | |
| D737,620 S | 9/2015 | Miller et al. | |
| D737,622 S | 9/2015 | Miller et al. | |
| 9,131,543 B2 | 9/2015 | Ben-Shmuel et al. | |
| 9,132,408 B2 | 9/2015 | Einziger et al. | |
| 9,179,506 B2 | 11/2015 | Sim et al. | |
| 9,210,740 B2 | 12/2015 | Libman et al. | |
| 9,215,756 B2 | 12/2015 | Bilchinsky et al. | |
| 9,351,347 B2 | 5/2016 | Torres et al. | |
| 9,374,852 B2 | 6/2016 | Bilchinsky et al. | |
| D769,669 S | 10/2016 | Kim et al. | |
| 9,560,699 B2 | 1/2017 | Zhylkov et al. | |
| 9,585,203 B2 | 2/2017 | Sadahira et al. | |
| 2002/0047009 A1* | 4/2002 | Flugstad | H05B 6/50 219/771 |
| 2005/0162335 A1 | 7/2005 | Ishii | |
| 2006/0289526 A1 | 12/2006 | Takizaki et al. | |
| 2009/0134155 A1 | 5/2009 | Kim et al. | |
| 2010/0115785 A1* | 5/2010 | Ben-Shmuel | F26B 3/347 34/260 |
| 2010/0176121 A1 | 7/2010 | Nobue et al. | |
| 2010/0187224 A1* | 7/2010 | Hyde | H05B 6/6455 219/720 |
| 2011/0031236 A1 | 2/2011 | Ben-Shmuel et al. | |
| 2011/0168699 A1 | 7/2011 | Oomori et al. | |

(56) References Cited

U.S. PATENT DOCUMENTS

| | | |
|---|---|---|
| 2011/0290790 A1 | 12/2011 | Sim et al. |
| 2012/0067872 A1 | 3/2012 | Libman et al. |
| 2012/0103972 A1 | 5/2012 | Okajima |
| 2012/0152939 A1 | 6/2012 | Nobue et al. |
| 2012/0160830 A1 | 6/2012 | Bronstering |
| 2013/0048881 A1 | 2/2013 | Einziger et al. |
| 2013/0080098 A1 | 3/2013 | Hadad et al. |
| 2013/0142923 A1 | 6/2013 | Torres et al. |
| 2013/0156906 A1 | 6/2013 | Raghavan et al. |
| 2013/0186887 A1 | 7/2013 | Hallgren et al. |
| 2013/0200066 A1 | 8/2013 | Gelbart et al. |
| 2013/0277353 A1 | 10/2013 | Joseph et al. |
| 2014/0197161 A1 | 7/2014 | Dobie |
| 2014/0203012 A1 | 7/2014 | Corona et al. |
| 2014/0208957 A1 | 7/2014 | Imai et al. |
| 2014/0231418 A1* | 8/2014 | Ikeda ............... H05B 6/645 219/705 |
| 2014/0277100 A1 | 9/2014 | Kang |
| 2015/0034632 A1 | 2/2015 | Brill et al. |
| 2015/0070029 A1 | 3/2015 | Libman et al. |
| 2015/0136758 A1 | 5/2015 | Yoshino et al. |
| 2015/0156827 A1 | 6/2015 | Ibragimov et al. |
| 2015/0173128 A1 | 6/2015 | Hosokawa et al. |
| 2015/0271877 A1 | 9/2015 | Johansson |
| 2015/0289324 A1 | 10/2015 | Rober et al. |
| 2015/0305095 A1 | 10/2015 | Huang et al. |
| 2015/0334788 A1 | 11/2015 | Hofmann et al. |
| 2015/0373789 A1 | 12/2015 | Meusburger et al. |
| 2016/0029442 A1 | 1/2016 | Houbloss et al. |
| 2016/0088690 A1 | 3/2016 | Kubo et al. |
| 2016/0119982 A1 | 4/2016 | Kang et al. |
| 2016/0219656 A1 | 7/2016 | Hunter, Jr. |
| 2016/0249416 A1* | 8/2016 | Elboim ............... H05B 6/72 |
| 2016/0327281 A1 | 11/2016 | Bhogal et al. |
| 2016/0353528 A1 | 12/2016 | Bilchinsky et al. |
| 2016/0353529 A1 | 12/2016 | Omori et al. |
| 2017/0099988 A1 | 4/2017 | Matloubian et al. |
| 2017/0105572 A1 | 4/2017 | Matloubian et al. |
| 2018/0324908 A1* | 11/2018 | Denker ............... G06T 7/0002 |

FOREIGN PATENT DOCUMENTS

| | | |
|---|---|---|
| CN | 201081287 Y | 7/2008 |
| CN | 102012051 A | 4/2011 |
| CN | 102620324 A | 8/2012 |
| CN | 103156532 A | 6/2013 |
| CN | 203025135 U | 6/2013 |
| CN | 105042654 A | 11/2015 |
| CN | 204987134 U | 1/2016 |
| CN | 106103555 A | 11/2016 |
| DE | 3238441 A1 | 4/1984 |
| DE | 102004002466 A1 | 8/2005 |
| DE | 102008042467 A1 | 4/2010 |
| EP | 0199264 A2 | 10/1986 |
| EP | 0493623 A1 | 8/1992 |
| EP | 1193584 | 3/2002 |
| EP | 1424874 A2 | 6/2004 |
| EP | 1426692 A2 | 6/2004 |
| EP | 1471773 A2 | 10/2004 |
| EP | 1732359 A2 | 12/2006 |
| EP | 1795814 | 6/2007 |
| EP | 1970631 A2 | 9/2008 |
| EP | 2031938 A1 | 3/2009 |
| EP | 2205043 A1 | 7/2010 |
| EP | 2230463 A1 | 9/2010 |
| EP | 2220913 B1 | 5/2011 |
| EP | 2512206 A1 | 10/2012 |
| EP | 2405711 A2 | 11/2012 |
| EP | 2618634 A1 | 7/2013 |
| EP | 2775794 A1 | 9/2014 |
| EP | 2906021 A1 | 8/2015 |
| EP | 2393339 B1 | 12/2016 |
| FR | 2766272 A1 | 1/1999 |
| FR | 2976651 A | 12/2012 |
| GB | 639470 A | 6/1950 |
| GB | 1424888 | 2/1976 |
| GB | 2158225 A | 11/1985 |
| GB | 2193619 A | 2/1988 |
| GB | 2367196 A | 3/2002 |
| JP | S55155120 A | 12/1980 |
| JP | 57194296 U | 12/1982 |
| JP | 59226497 A | 12/1984 |
| JP | H0510527 A | 1/1993 |
| JP | H06147492 A | 5/1994 |
| JP | 8-171986 | 7/1996 |
| JP | 2000304593 A | 11/2000 |
| JP | 2008108491 A | 5/2008 |
| JP | 2011146143 A | 7/2011 |
| JP | 2013073710 A | 4/2013 |
| KR | 2050002121 | 7/2005 |
| KR | 101359460 B1 | 2/2014 |
| KR | 20160093858 A | 8/2016 |
| RU | 2122338 C1 | 11/1998 |
| RU | 2215380 C2 | 10/2003 |
| RU | 2003111214 A | 11/2004 |
| RU | 2003122979 A | 2/2005 |
| RU | 2008115817 A | 10/2009 |
| RU | 2008137844 A | 3/2010 |
| WO | 8807805 A1 | 10/1988 |
| WO | 0036880 | 6/2000 |
| WO | 02065036 A1 | 8/2002 |
| WO | 03077601 A1 | 9/2003 |
| WO | 2008018466 A1 | 2/2008 |
| WO | 2008102360 A1 | 8/2008 |
| WO | 2009039521 A1 | 3/2009 |
| WO | 2011138680 A2 | 11/2011 |
| WO | 2012001523 A2 | 1/2012 |
| WO | 2012162072 | 11/2012 |
| WO | 2011039961 A1 | 2/2013 |
| WO | 2015024177 A1 | 2/2015 |
| WO | 2015099648 A1 | 7/2015 |
| WO | 2015099650 A1 | 7/2015 |
| WO | 2015099651 A1 | 7/2015 |
| WO | 2016128088 A1 | 8/2016 |
| WO | 2017190792 A1 | 11/2017 |

* cited by examiner

METHOD AND APPARATUS FOR DETERMINING HEATING STRATEGIES

BACKGROUND OF THE INVENTION

Current microwave cooking appliances use powerful tubes with nominal operating frequencies to heat up food. This current method of cooking utilizes a powerful source with no control over the emission of the microwaves. Utilizing solid state sources and specifying emissions would begin to allow for a more controlled cooking appliance. Initial solid state sourced microwave cooking appliance designs include determining a model of the cavity of the microwave, but do not allow for specified cooking strategies regarding the food within the cavity. There is a need to specify the emissions using solid state sources to allow for even heating for a specific food item and as a result a more efficient appliance.

SUMMARY OF THE INVENTION

A method of determining heating setting heating strategies for a solid state microwave cooking appliance having a cavity in which a food item is to be heated, and a controllable source of microwave emissions includes obtaining an appliance data set representing geometry dimensions, power values, and frequency values of the solid state microwave cooking appliance, selecting one or more food items, each selected food item having a permittivity value and an initial temperature, determining a target outcome for heating the selected food item(s), estimating a heating strategy for the target outcome based on the data set, including operating the controllable source of microwave emissions, applying the estimated heating strategy to the selected food item(s), obtaining a food geometry of the cooking appliance while applying the estimated heating strategy, determining an actual outcome based on the food geometry, permittivity value, and initial temperature, and comparing the actual outcome to the target outcome. If the actual outcome is not within a threshold of the target outcome, then the method repeats the estimating, applying, obtaining, and comparing steps until the actual outcome is within a threshold of the target outcome. If the actual outcome is within a threshold of the target outcome, then the method outputs a food data set representative of the estimated heating strategy to a memory for the solid state microwave cooking appliance.

DETAILED DESCRIPTION

Figure 1:
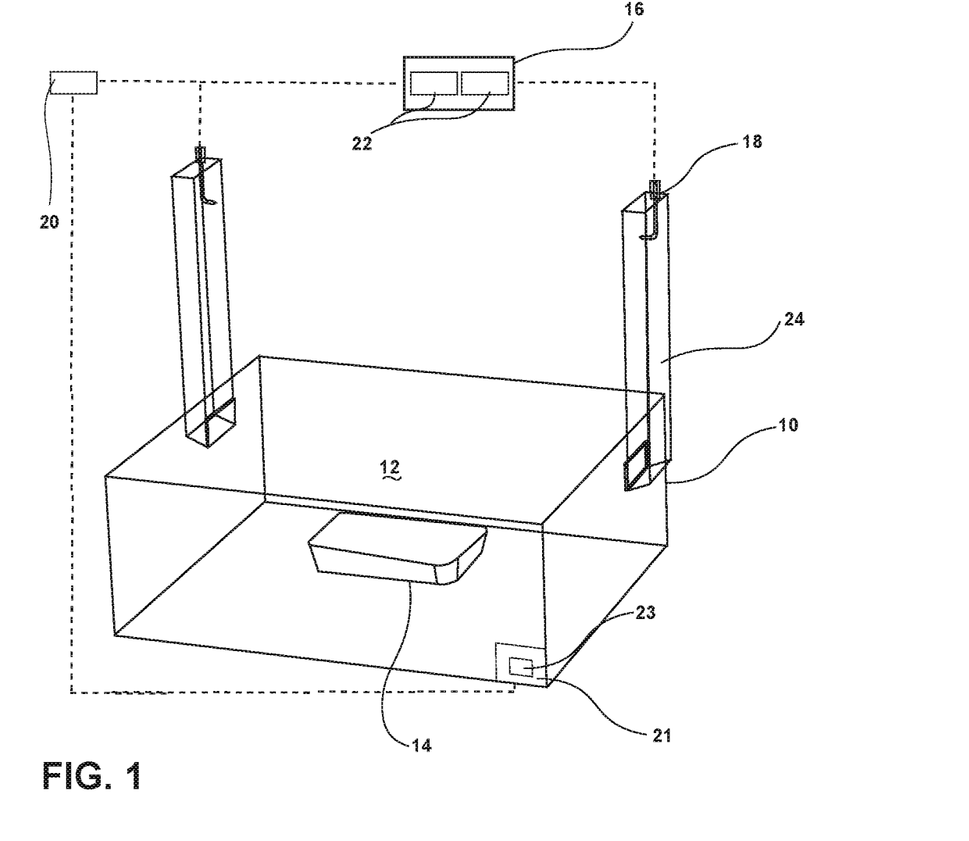
FIG. 1 is a schematic view of cooking appliance according to an embodiment of the invention.

FIG. 1 illustrates a solid state microwave cooking appliance 10, of the type typically applicable for the invention, comprising a cavity 12 into which a food item 14 can be placed for heating. The cooking appliance 10 includes a controllable source 16 of microwaves disposed to provide microwaves to the cavity 12. The controllable source 16 of microwaves is preferably powered by a power source 20 with an input range of less than 1 W to 250 W, and includes at least one microwave generator 22, preferably solid state, capable of generating an energy field (e.g. see FIG. 2), with an operating frequency ranging from 2.401 GHz to 2.48 GHz. In one embodiment, the microwave generator 22 is connected to an antenna 18 in a waveguide channel 24 that conveys microwaves to the cavity 12 via an opening or feeding port in a wall of the cavity. In an exemplary embodiment, the cooking appliance 10 can have two or more microwave generators 22. The controllable source 16 is also coupled to an operating control system 21 programmed to control the power output of the power source 20, and the frequency of the microwave generator 22, and, in the case of two or more microwave generators 22, the phase of the generators to alter the interference pattern of the electromagnetic waves in the cavity. The operating control system 21 also includes a memory 23 capable of storing a data set representative of a plurality of heating strategies.

In order to apply specific heating strategies in a controlled and reliable way, modeling the heating strategies in a simulation comprising an electromagnetic simulator, for example HFSS (high frequency structural simulator), VORPAL, or XFdtd (window system finite difference time domain), or any other simulator known in the art, is carried out in a process of setting heating strategies for the cooking appliance 10.

The process commences when the operating control system 21 obtains an appliance data set representing geometry dimensions, power values, and frequency values available for the cooking appliance 10. The power values and frequencies are dependent upon the microwave generator(s) 22 in the cooking appliance 10, while the geometry dimensions are obtained using a known grid method for obtaining the geometry of the cavity 12, for example a finite element method (FEM) or a finite-differences time-domain (FDTD). A model of the cavity 12 of the cooking appliance 10 including any accessories inside the cavity 12 is then stored as the geometry dimensions of the cavity 12.

At least one of a plurality of food items 14 is selected and placed within the cavity 12 and an initial food geometry is then obtained using the same grid method as used in obtaining the geometry of the cavity 12 and along with the data set is stored in a lookup table. The food geometry is the geometry of the cavity described above with the food item 14 placed within it. It will be understood that the food geometry will change as the food item 14 is heated. For example the food item 14 will expand, shrink, or move, thereby changing the food geometry. Along with having an associated initial food geometry, each of the at least one of a plurality of food items 14 has an initial permittivity value and an initial temperature. These values may be stored in and taken from the lookup table depending on the food item 14 selected and, together, comprise initial food parameters.

A heating strategy for cooking the food item 14 is estimated based on the data set, initial food parameters and a target outcome. A target outcome may be for example, a re-heat, defrost, or popcorn function. The data set, initial food parameters and the chosen target outcome together enable the estimation of a specific heating strategy specific to the food item 14 which is then simulated with the electromagnetic simulator. The heating strategy includes operating the controllable source 16 of microwave emissions to create multiple heating patterns, for which various possible excitation conditions, e.g., frequencies, sources, amplitudes and phase shifts are tested and stored as single heating patterns. The heating strategy can be made up of a single heating pattern or a collection of heating patterns applied in sequence to obtain the target outcome.

The heating strategy is then applied during which the simulation provides the operating control system 21 with a location of the food item 14 and any modifications to the food geometry that may occur during the heating strategy. These modifications are recorded as iterations of the food geometry and used to provide feedback to the simulation in order to determine an actual outcome within a threshold of the target outcome. The actual outcome is determined based on the food geometry, permittivity value, and temperature of the food item 14 at the end of the simulation and then compared to the target outcome. In the event that the actual outcome is not within a threshold of the target outcome, the method repeats the estimating, applying, obtaining, and comparing steps until the actual outcome is within a threshold of the target outcome.

If the actual outcome is within the threshold of the target outcome, a food data set representative of the estimated heating strategy is output to the memory 23 for the cooking appliance 10 as a heating strategy specific to the aforementioned food item 14. The output data stored in the memory 23 is made up of a sequence of frequencies, amplitudes and phase shifts for each specific heating strategy which is recorded in the lookup table. The simulation is repeated a number of times for a plurality of food items 14 to create the lookup table capable of recalling a specific sequence for each heating strategy so that in the case that a user inputs, for example, 0.5 kg frozen chicken with a target outcome of de-frost, a heating strategy is pulled up and applied for that specific type of food.

A specific heating strategy comprises at least one heating pattern which is a function of the squared energy field and loss figure as shown below where $u_{ES}$ is the total energy per unit volume stored by the electromagnetic field, $\varepsilon$ is the permittivity value, or the resistance encountered when forming the energy field within the cavity 12, and E is the electric field.

$$u_{ES} = \frac{1}{2}\varepsilon|E|^2,$$

More specifically the loss figure can be expressed as the imaginary part, $\varepsilon''$, of the permittivity, $\varepsilon$, for complex permittivity represented by:

$$\hat{\varepsilon}(\omega) = \varepsilon'(\omega) - i\varepsilon''(\omega) = \left|\frac{D_0}{E_0}\right|(\cos\delta - i\sin\delta).$$

The loss figure can also be expressed as a loss tangent defined as the ratio or angle, $\delta$, in a complex plane of the resistive reaction to the electric field E as represented by:

$$\tan\delta = \frac{\omega\varepsilon'' + \sigma}{\omega\varepsilon'}$$

Where $\sigma$ is the free charge conduction, $\varepsilon'$ is the real part and $\varepsilon''$ is the imaginary part of the complex permittivity, and $\omega$ is the angular frequency of the electric field. Other forms known in the art for determining the loss figure can also be applied.

The sequence of actuations might be obtained also without a simulation-based design approach (i.e. via direct trial and error testing and/or other optimization techniques known in the art). A plurality of sensors can be disposed within the cooking appliance 10 to monitor changes of the applied energy field when the cooking appliance 10 is in operation. When a heating sequence is applied, characteristics of the one of a plurality of food items 14 will change causing the initial food parameters to change. The operating control system 21 can be configured to compare the estimated heating strategy to the monitored changes of the applied energy field using a correlation operator make modifications accordingly. Therefore despite the initial food parameter changes, the cooking appliance 10 includes predictable repeatability and can carry out automatic changes to heating sequences based on direct feedback during the cooking cycle.

Figure 2:
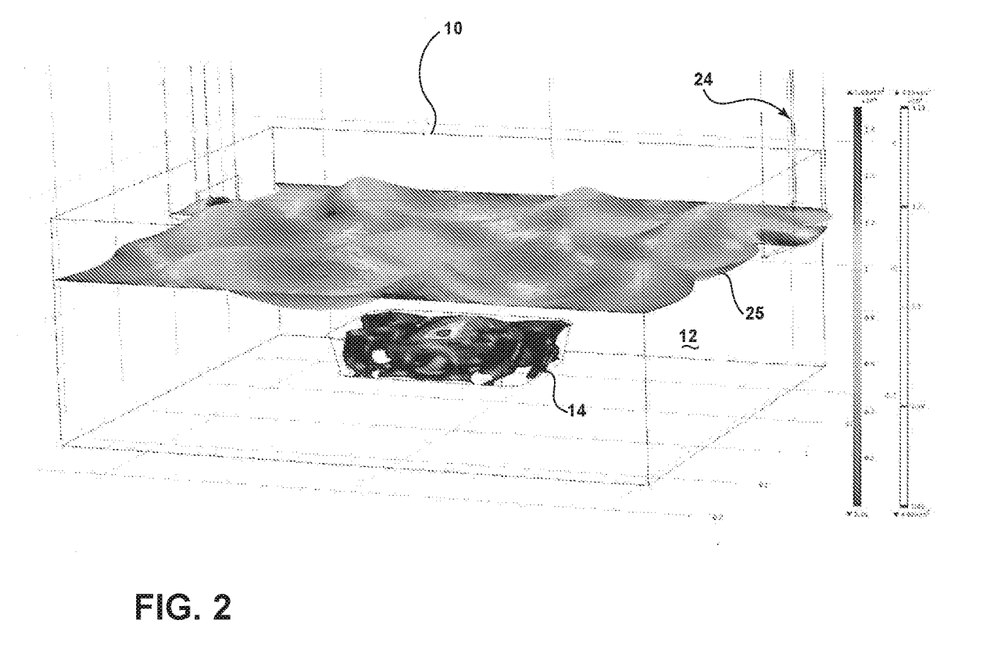
FIG. 2 is a schematic view of an energy field for the cooking appliance of FIG. 1.

FIG. 2 illustrates an exemplary embodiment in which a heating strategy for a specific food item 14 with the defrost function is simulated. This specific heating strategy includes a heating sequence in which a first heating pattern comprises the energy field 25 aiming at focusing energy at the center 26 of the food item 14. The power output, frequency and phase shift are controlled in such a manner that the energy field 25 is more pronounced in the center 26 of the food.

Figure 3:
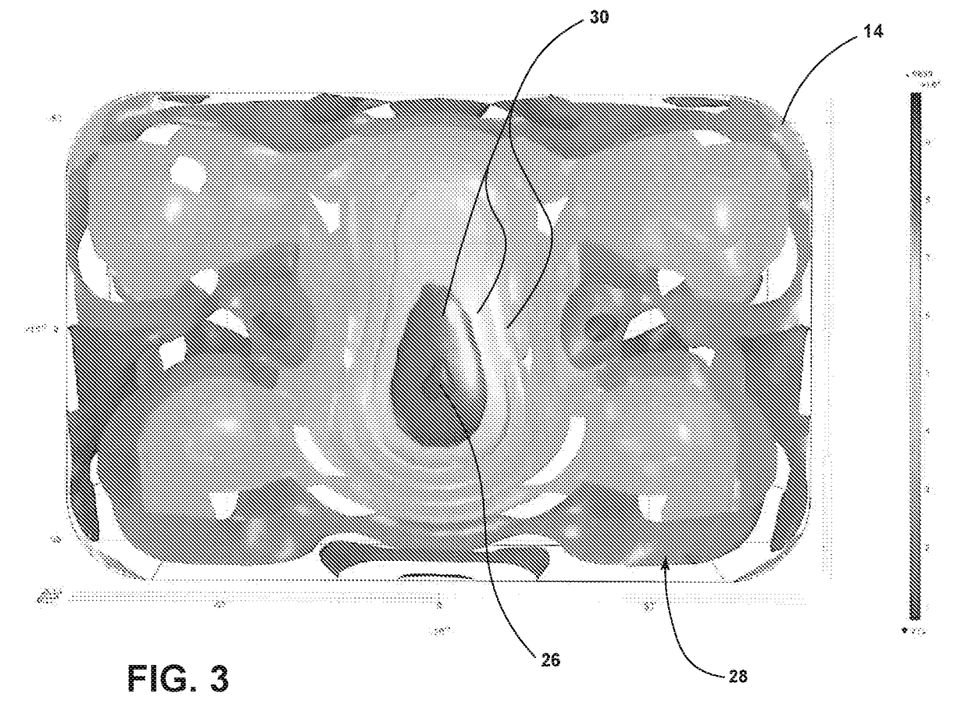
FIG. 3 is depicts an energy field for a cooking function in the cooking appliance of FIG. 1.

Then as can be seen in FIG. 3, according to the heating sequence a second heating pattern 28 includes areas 30 radiating out from the center 26 are subsequently heated in a manner as to bring the entire food item 14 to a desired temperature. Further heating patterns can be implemented as necessary to evenly defrost the food item 14. In the event the simulation outputs a data set within the threshold of the target outcome, the actual outcome becomes a set of heating patterns specific to this heating strategy associated with the defrost function for the specific food item 14.

Other embodiments include the re-heat function with one evenly distributed heating pattern in which the entire food is brought to a desired temperature at the same time. While the popcorn function can include a randomized heating sequence with multiple heating patterns each of which include concentrated energy portions.

The operating control system 21 stores multiple frequency, amplitude, and phase shifts rather than storing the heating patterns themselves. This is more cost effective and allows for multiple combinations of parameters to achieve specific heating patterns.

Figure 4:
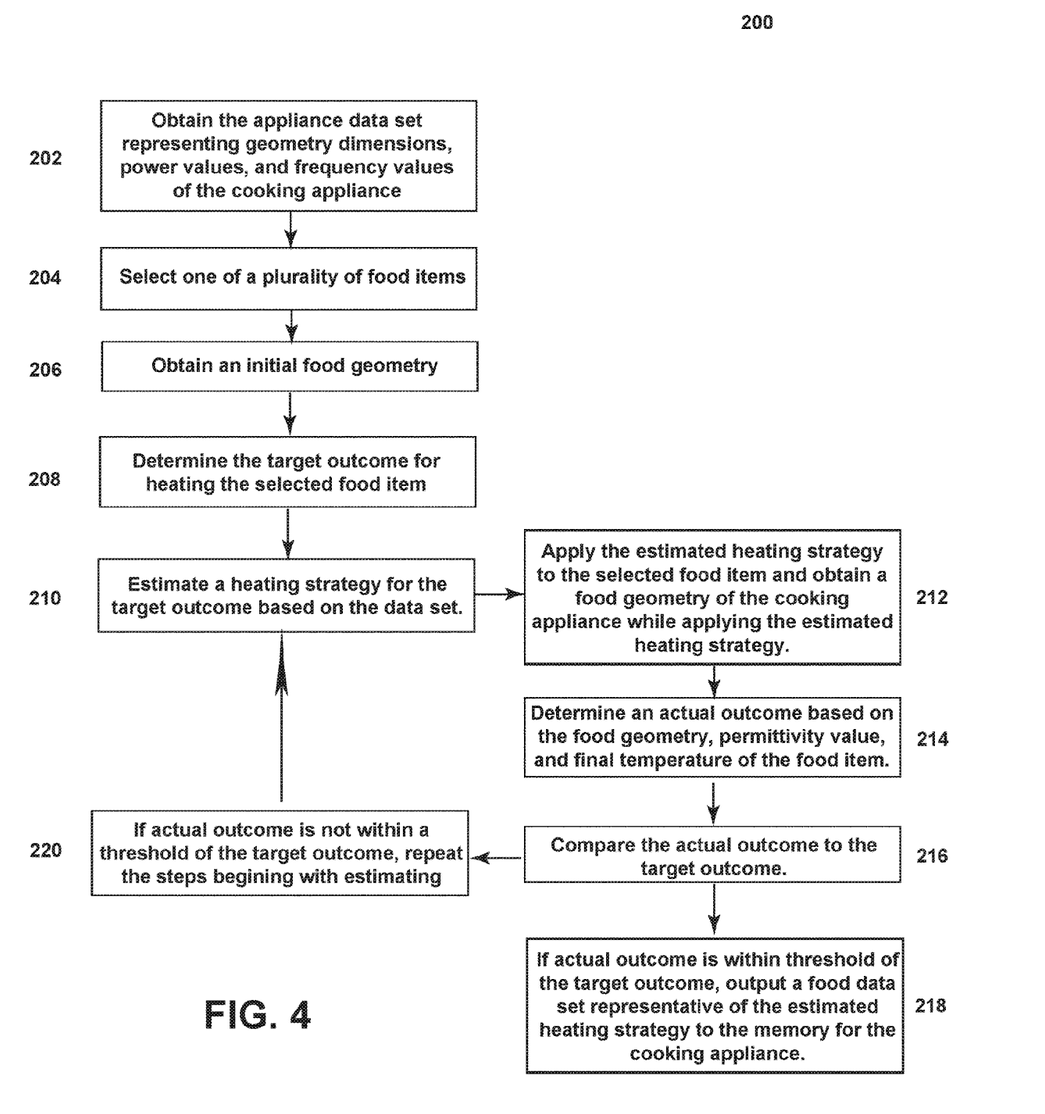
FIG. 4 depicts a method for determining heating strategies for the cooking appliance of FIG. 1.

A method 200 illustrating the process described above in which heating strategies are determined for the cooking appliance 10 is depicted in FIG. 4. First obtain 202 the appliance data set representing geometry dimensions, power values, and frequency values of the cooking appliance 10. Then select 204 one of a plurality of food items 14 and obtain 206 an initial food geometry. Next determine 208 the target outcome for heating the selected food item 14 and estimate 210 a heating strategy for the target outcome based on the data set. Apply 212 the estimated heating strategy to the selected food item 14 and obtain a food geometry of the cooking appliance 10 while applying the estimated heating strategy. Finally determine 214 an actual outcome based on the food geometry, permittivity value, and final temperature of the food item 14. After the determination, compare 216 the actual outcome to the target outcome and if the actual outcome is not within a threshold of the target outcome, repeat 220 the estimating, applying, obtaining and comparing steps until the actual outcome is within the threshold of the target outcome. If the actual outcome is within a threshold of the target outcome, output a food data set representative of the estimated heating strategy to the memory 23 for the cooking appliance 10.

The term energy field, as used herein, includes any or all portions of the electromagnetic spectrum, including but not limited to, radio frequency (RF), infrared (IR), near infrared, visible light, ultraviolet, etc. In some cases, applied electromagnetic energy may include RF energy with a wavelength of 100 km to 1 mm, which is a frequency of 3 KHz to 300 GHz, respectively. In some cases, RF energy within a narrower frequency range, e.g., 1 MHz-100 GHz, may be applied. Microwave and ultrahigh frequency (UHF) energy, for example, are both within the RF range. Even though examples of the invention are described herein in connection with the application of RF energy, these descriptions are provided to illustrate a few exemplary principles of the invention, and are not intended to limit the invention to any particular portion of the electromagnetic spectrum. However, the methods and apparatus described may be particularly useful for dealing with objects that are smaller than a wavelength of the applied electromagnetic energy. Furthermore, the described methods and apparatus may be particular useful when the energy application zone comprises a modal cavity, as defined herein.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method of heating a selected food item by setting heating strategies for a solid state microwave cooking appliance having a cavity in which the selected food item is to be heated, and a controllable source of microwave emissions, the method comprising:
    obtaining an appliance data set representing geometry dimensions, power values, and frequency values of the solid state microwave cooking appliance without the food item present in the cavity;
    selecting one of a plurality of food items, each selected food item having a permittivity value and an initial temperature;
    obtaining an initial food geometry with the selected food item in the cavity;
    determining a target outcome for heating the selected food item including a target food geometry, a target permittivity value, and a target temperature;
    estimating a heating strategy having at least one heating pattern selected to obtain the target outcome based on the appliance data set, including operating the controllable source of microwave emissions, the at least one heating pattern is a function of the squared energy field and loss figure as shown below where $u_{ES}$ is the total energy per unit volume stored by the electromagnetic field, $\varepsilon$ is the permittivity value, or the resistance encountered when forming the energy field within the cavity, and E is the electric field, $$u_{ES} = \tfrac{1}{2} \varepsilon |E|^2,$$

heating the selected food item by applying the estimated heating strategy to the selected food item;
    obtaining a subsequent food geometry with the selected food item in the cavity while applying the estimated heating strategy;
    determining an actual outcome based on the obtained subsequent food geometry, permittivity value, and temperature;
    analyzing whether the actual outcome has reached the target outcome by comparing the observed subsequent food geometry to the target food geometry, the observed permittivity value to the target permittivity value, and the observed temperature to the target temperature;
    repeating the estimating, heating, obtaining a subsequent food geometry, and analyzing steps to continue to heat the selected food item until the actual outcome is within the threshold of the target outcome; and
    outputting a food data set representative of the estimated heating strategy to a memory for the solid state microwave cooking appliance.

2. The method of claim 1 wherein operating the controllable source of microwave emissions includes a sequence of at least one of frequencies, amplitudes, or phase shifts.

3. The method of claim 1 where the estimated heating strategy comprises a heating sequence including a plurality of heating patterns.

4. The method of claim 1 wherein the target outcome is the result of one of a re-heat function, a defrost function, or a popcorn function.

5. The method of claim 1 further including repeating the method for a plurality of different food items.

6. A method of heating a selected food item by setting heating strategies for a solid state microwave cooking appliance having a cavity in which the selected food item is to be heated, and a controllable source of microwave emissions, the method comprising:
    obtaining an appliance data set representing geometry dimensions, power values, and frequency values of the solid state microwave cooking appliance without the food item present in the cavity;
    selecting one of a plurality of food items, each selected food item having a permittivity value and an initial temperature;
    obtaining an initial food geometry with the selected food item in the cavity;
    determining target values including a target food geometry, a target permittivity value, and a target temperature for heating the selected food item, wherein the target values are determined based on a selection of one of a re-heat function, a defrost function, and a popcorn function;
    estimating a heating strategy having at least one heating pattern selected to obtain the target values based on the appliance data set, including operating the controllable source of microwave emissions, the at least one heating pattern is a function of the squared energy field and loss figure as shown below where $u_{ES}$ is the total energy per unit volume stored by the electromagnetic field, $\varepsilon$ is the permittivity value, or the resistance encountered when forming the energy field within the cavity, and E is the electric field, $$u_{ES} = \tfrac{1}{2} \varepsilon |E|^2,$$

heating the selected food item by applying the estimated heating strategy to the selected food item;
    observing a subsequent food geometry with the selected food item in the cavity while applying the estimated heating strategy;
    determining actual values including the actual permittivity value and actual temperature of the selected food item;
    analyzing whether the actual values have reached the target values by comparing the observed subsequent food geometry to the target food geometry, the actual permittivity value to the target permittivity value, and the actual temperature to the target temperature;

repeating the estimating, heating, observing a subsequent food geometry, determining, and analyzing steps to continue to heat the selected food item until the actual values are within the thresholds of the target values; and outputting a food data set representative of the estimated heating strategy to a memory for the solid state microwave cooking appliance.

\* \* \* \* \*